UNITED STATES PATENT OFFICE.

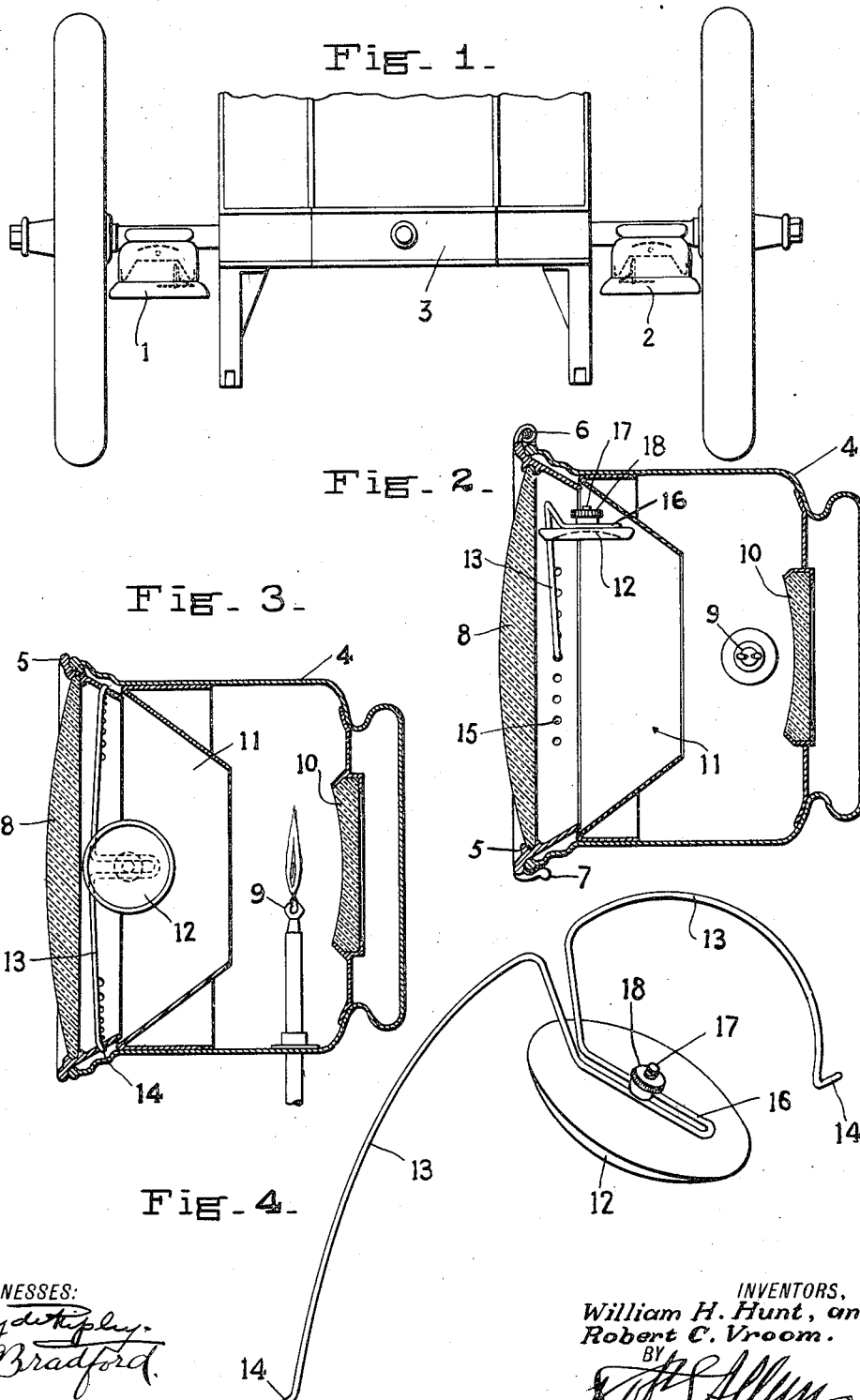

WILLIAM H. HUNT AND ROBERT C. VROOM, OF SAN DIEGO, CALIFORNIA.

HEADLIGHT FOR AUTOMOBILES.

982,066.　　　　　Specification of Letters Patent.　　Patented Jan. 17, 1911.

Application filed June 6, 1910. Serial No. 565,308.

*To all whom it may concern:*

Be it known that we, WILLIAM H. HUNT and ROBERT C. VROOM, citizens of the United States, residing at San Diego, State of California, have invented certain new and useful Improvements in Headlights for Automobiles, &c., of which the following is a specification.

Our invention relates to reflecting lamps and particularly headlights for automobiles and the like.

The main object is to throw a part of the light laterally so as to light up the sides of the road.

Another object is to provide simple and inexpensive means which may be readily attached to and adjusted to different lamps for producing lateral deflection.

The invention consists in improvements, the principles of which are illustrated in the accompanying single sheet of drawings.

In its preferred form it consists preferably of a lamp body having a source of light, a main projecting reflector at the rear, a diffusing reflector in front and a lateral deflecting reflector at one side of the diffusing reflector. Two of these lamps are usually and preferably provided on an automobile, one at each side. The laterally deflecting reflector of the right hand lamp is on the left hand side of the lamp so as to deflect a part of the light to the right. The deflecting reflector of the left hand lamp is on the right side of the lamp for deflecting a part of the light to the left.

In Figure 1 is a diagrammatic plan view of the front end of an automobile with two lamps with reflectors arranged according to our invention. Fig. 2 is a horizontal sectional view of the lamp to be used on the left hand side of the automobile. Fig. 3, is a vertical sectional view of the same. Fig. 4, is a perspective view of one of the deflecting attachments. In Fig. 1 the right and left hand lamps are indicated by the numerals 1 and 2 respectively and the front end of the automobile indicated by the numeral 3.

The details of construction of the body and support of the lamp are unimportant. In the form illustrated the body 4 has a front door rim or frame 5 hinged at 6 and provided with a catch 7 and a suitable lens or glass 8 secured in any suitable manner.

The character of the source of light is unimportant. We have shown it here as a gas burner 9. Back of this is the main concave projecting mirror 10 shaped and arranged in a suitable manner so as to project a substantial shaft of light straight forward. In front of the main mirror or reflector is a conical reflector 11 which serves to diffuse a part of the light from the burner and makes a sort of glow. The laterally deflecting mirror or reflector 12 is preferably arranged so that it does not interfere with or subtract from the main shaft of light projected forward by the main mirror 10. This deflecting mirror is preferably concaved slightly but it may be flat if desired. From the position of this mirror 12 in Figs. 2 and 3 it will be seen that a part of the light coming directly from the burner 9 will be deflected laterally of the lamp and as a definite beam or shaft independent of the diffused light from the mirror 11.

So far as a broad idea of this invention is concerned the deflecting mirror 12 may be constructed and mounted in any suitable manner. The preferred construction however is that illustrated in Fig. 4. The mirror is carried by a frame or support made of wire which has the arms 13, 13 terminating in tips 14, 14 which are adapted to be inserted in any one of a number of holes in the top and bottom of the rim 5 of the door of the lamp inside of the glass 8. This support is elastic so that it may be conveniently sprung into place and retained without other means of attachment. A part of the wire is formed into a loop-like guide post 16 which is bent at an angle to the arms 13, 13 so as to bring the mirror inside of the vertical plane of the door and out of contact with the front glass 8. A stud or screw shank 17 carried by the mirror projects between the sides of the loop 16 and a thumb-nut 18 is provided for clamping the mirror 12 in place. By this construction the mirror may be adjusted backward or forward to obtain the proper lateral deflection. The wire supporting frame may also be bent to a considerable degree to correspond with the size and shape of the interior of the particular lamp to which it is to be attached. Thus it will be seen that the attachment is adapted to different lamps and thus constitutes an article of manufacture salable independently of the other parts of the lamp and intended to be adapted to any suitable form of lamp.

The advantages of the invention will be apparent to those who are acquainted with the use of automobiles and other vehicles at night.

Changes of details in construction and arrangement of the parts may be made without departing from the spirit and scope of our invention.

What we claim is:—

1. In a lamp, a casing, a source of light, a main projecting mirror arranged behind the source of light, a front glass for the casing and a deflecting mirror arranged inside the casing behind the front glass in front of the source of light and at one side thereof for horizontally deflecting to the opposite side and out through the front glass, a portion of the rays from the source of light.

2. In a lamp, a main projecting mirror, a diffusing mirror forward thereof, and a laterally deflecting mirror arranged at one side of the diffusing mirror to deflect a part of the light to the opposite side.

3. In a lamp, a source of light 9, a main projecting mirror 10 in rear thereof, a front glass 8 and a laterally deflecting mirror 12 arranged at one side between the source of light and the front glass for deflecting a portion of the light horizontally to the opposite side through the front glass.

4. In a lamp, a main projecting mirror, a laterally deflecting mirror arranged at one side thereof, for deflecting a portion of the light to the opposite side, said deflecting mirror being adjustable horizontally in said lamp toward and from the main projecting mirror.

5. A reflecting lamp comprising a body, a front door hinged thereto, a main projecting mirror mounted in the body of the lamp and a laterally deflecting mirror supported by the inside of the front door of the lamp and movable therewith.

6. In a lamp, a main projecting mirror, a conical diffusing mirror and a substantially vertical deflecting mirror arranged at one side of the diffusing mirror for throwing an independent lateral beam of light.

7. In a lamp, a main projecting mirror and a frame having supporting arms and a guide post and a deflecting mirror clamped to said guide post and adjustable thereon in relation to said projecting mirror.

8. In a lamp, a source of light, a projecting mirror in rear thereof, a front glass and an angularly adjustable deflecting mirror arranged at one side between the source of light and the front glass for deflecting a part of the light to the opposite side.

9. A lamp attachment comprising curved wire arms 13, 13 having tips 14, 14 bent at an angle thereto and extending outwardly in the general direction of the radii of the curved arms, a post 16 extending at an angle to the plane of the arms and a mirror 12 clamped to said post, said tips being adapted to be inserted in recesses at the front of a lamp so as to bring the mirror in position at one side of the lamp to deflect a part of the light across the lamp body.

WILLIAM H. HUNT.
ROBT. C. VROOM.

Witnesses:
R. H. ANDERSON,
JAS. E. LEWIS.